United States Patent [19]
Adams

[11] Patent Number: 5,881,633
[45] Date of Patent: Mar. 16, 1999

[54] COOKING APPARATUS HAVING SUPPORT FOR FOOD MANIPULATION MEANS

[76] Inventor: Thomas D. Adams, 7721 Golfcrest Dr., San Diego, Calif. 92119

[21] Appl. No.: 787,361

[22] Filed: Jan. 22, 1997

[51] Int. Cl.[6] .............................. A47J 37/00; A47J 43/00
[52] U.S. Cl. .................... 99/341; 99/348; 99/422; 99/645; 220/367.1; 220/369; 220/377; 366/130; 366/243
[58] Field of Search .................... 99/422–425, 645; 126/299 C, 381, 390; 366/129–130, 285, 347, 279, 242–247; 220/366.1, 369, 370, 731, 661–663, 676, 334, 336, 345

[56] References Cited

U.S. PATENT DOCUMENTS

| | | | |
|---|---|---|---|
| 2,559,196 | 7/1951 | Medved | 99/422 |
| 2,568,367 | 9/1951 | Jardim | 99/422 |
| 2,664,169 | 12/1953 | Misener et al. | 99/645 X |
| 2,770,389 | 11/1956 | Drakoff | 99/645 |
| 5,481,967 | 1/1996 | Chen | 126/299 C |

*Primary Examiner*—Timothy F. Simone
*Attorney, Agent, or Firm*—Page Lohr Associates

[57] ABSTRACT

A cooking apparatus in the form of a skillet with a complementary lid has a specially designed provision which accommodates a cooking utensil. The cooking utensil may be used to manipulate food being cooked while the skillet and lid remain coupled together thus preventing splattering of food residue about the cooking area. The skillet and lid, in combination form a cooking chamber. The chamber remains substantially enclosed throughout the cooking process. As the food being cooked needs attention, for example stirring or flipping, the utensil may be employed to effect such without disturbing the integrity of the cooking chamber. A lid of the apparatus may be formed of glass material to allow a chef a view into the chamber. In addition, a specialized coupling between a skillet rim and the lid provides improved reduction of mess.

15 Claims, 8 Drawing Sheets

COOKING APPARATUS HAVING SUPPORT FOR FOOD MANIPULATION MEANS

BACKGROUND OF THE INVENTION

Field

The instant invention is generally concerned with kitchenware for cooking and specifically concerned with skillets having coverings configured for support of a utensil such as a common spatula or spoon. In addition, apparatus are arranged with a view to reducing mess caused by splattering of grease and other cooking residue.

Preparation of certain foods may call for frying in pan or skillet. For example, a hamburger patty, which is sometimes preferably fried in a skillet. Hamburger naturally contains grease and oils which facilitate the cooking of the hamburger as they transmit heat quite well. However, one will appreciate a great problem which accompanies frying hamburger in a pan: that is, the splattering of grease from the pan to all areas about the kitchen and in particular about the stove. The oils get very hot and occasionally pop with strong force. This tends to propel oil and other debris, i.e. food particles, about the cooking area. In addition, these hot oils may be dangerous as they cause burns when they come into contact with persons near the stove.

Of course, the obvious solution to such a problem, suggests that a lid which tightly fits onto an upper rim of the skillet be put in place while cooking. However, such practice is flawed by serious problems. The lid must be removed to view the food while monitoring the cooking progress. In addition, it is sometimes desirable to manipulate the food by stirring or flipping. While the lid is removed, the grease will splatter about. This is particularly troublesome in the case of a hamburger because when a hamburger is flipped or otherwise manipulated, it tends to agitate the oils which causes them to pop and splatter even more vigorously. Since the lid cannot be in place while the manipulation occurs, the oils escape confinement and frustrates the problem the lid was intended to solve, and thus, defeats its purpose. A common skillet lid does not cooperate with the task of allowing one to manipulate the food being cooked while operating to prevent a mess.

While the systems and inventions of the prior art are designed to achieve particular goals and objectives, some of those being no less than remarkable, these inventions have limitations which prevent their use in new ways now possible. Prior art inventions are not used and cannot be used to realize the advantages and objectives of the present invention.

SUMMARY OF THE INVENTION

Statement of the Invention

Comes now, Thomas D. Adams, of Spring Valley, Calif. with an invention of a cooking apparatus having support for food manipulation means. This invention stands in contrast to prior art methods and devices because those systems do not allow one to manipulate cooking food while simultaneously protecting against splatter and spread of oils and other cooking residue. The present invention allows a lid to remain coupled to a skillet thus preventing the spread of mess while simultaneously allowing one to manipulate cooking food via use of a utensil which remains operable while the lid is in place. The apparatus further protects users of it from being burned by hot foods as the lid permits continuous containment of foods.

An apparatus of the invention may comprise a special lid arranged with a slot opening which allows one to easily manipulate food with a utensil while the lid remains coupled with the skillet. A utensil such as a spatula can be placed such that its handle extends outwardly from the slot while its primary operating end remains in a cooking chamber formed by the skillet and lid thereon. The handle end of the utensil is readily engaged by a chef's hand, while the lid remains in place. For most versions, is may be preferred that the lid be made of transparent material such as glass or plastic so that one can easily view the food being cooked. Additional support for the utensil may include a hook on the underside of the lid from which the utensil might be held away from the food being cooked.

Another feature of apparatus of the invention includes a provision which relates to the task at hand, i.e. manipulating food in the cooking chamber while the lid remains in place. Most common pans could not support such a task even if means were provided for introduction of a cooking utensil. A restriction arises as a result of the aspect ratio of common skillet designs. A pan is typically far wider than it is deep. For example, a pan with lid may be twelve inches across and only two inches deep. Even a large pan which may be twenty-four inches across, would likely be only four inches in depth. This would prevent one from flipping a four inch hamburger patty while a lid remained in contact with the skillet. Accordingly, the invention provides that the cooking chamber formed by the lid and skillet together be made with a lower aspect ratio width-to-height. A twelve inch skillet of the invention may have a four and a half, or even five inch or greater depth. Thus a hamburger patty may be flipped from one side to another in the cooking chamber while the lid constantly remains coupled to the rim of the skillet.

Still further another provision included in skillets of the invention relates to an improved rim. A lid typically engages a skillet at a rim about an upper edge of the skillet. A specially formed edge further improves containment of particulate within the cooking vessel.

A fundamental difference between apparatus of the instant invention and those of the art can be found when considering the cooperation between cooking utensils and skillet lids. Further, apparatus of the invention allow one to cook while a lid remains coupled to a skillet thus preventing the spread of mess.

OBJECTIVES OF THE INVENTION

It is a primary object of the invention to provide a cooking apparatus which reduces messes occasioned in cooking processes.

It is a primary object of the invention to provide a cooking apparatus which reduces accidents of burning.

It is another object of the invention to provide a cooking vessel having a skillet and lid arranged to cooperate with cooking utensils.

It is a further object of the invention to provide a cooking apparatus having a lid with a slot therein.

A better understanding can be had with reference to the detailed description of Preferred Embodiments and with reference to the appended drawings. These embodiments represent particular ways to realize the invention and are not inclusive of all ways possible. Therefore, there may exist embodiments that do not deviate from the spirit and scope of this disclosure as set forth by the claims, but do not appear here as specific examples. It will be appreciated that a great plurality of alternate versions are possible.

BRIEF DESCRIPTION OF THE DRAWING FIGURES

These and other features, aspects, and advantages of the present invention will become better understood with regard to the following description, appended claims and drawings where:

PREFERRED EMBODIMENTS OF THE INVENTION

Figure 1:
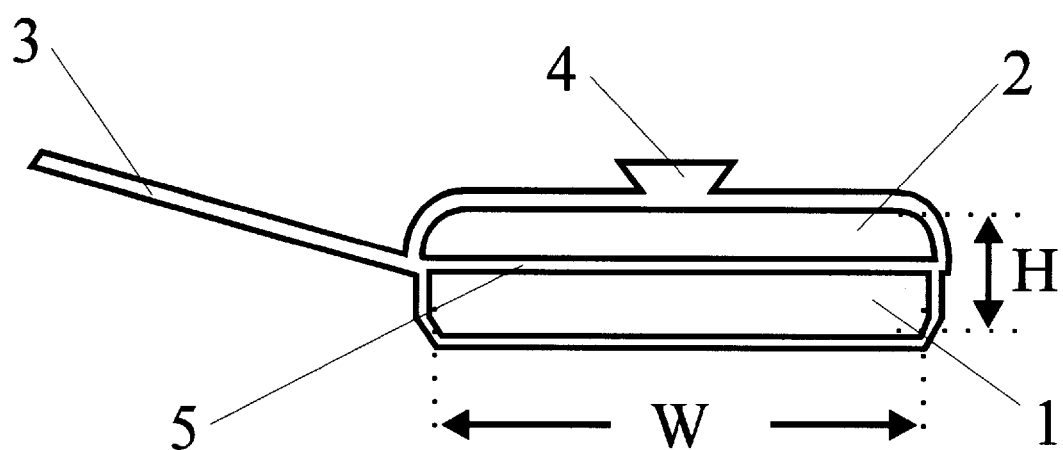
FIG. 1 is a prior art drawing of a skillet and lid coupled together having a high aspect ratio.

In accordance with each of the preferred embodiments of the invention, there is provided a cooking apparatus having support for a food manipulation means. It will be appreciated that each of the embodiments described include an apparatus and that the apparatus of one preferred embodiment may be different than the apparatus of another preferred embodiment. The following examples are taught as being illustrative examples. One should not attempt to limit the invention to these examples, but rather, the true scope and spirit of the invention should be appreciated in consideration of the claims appended hereto.

The invention primarily includes a special cooking apparatus which is comprised of a skillet and a lid. The skillet and lid are arranged with particular features which cooperate to advance objectives of the invention. Most particularly, a slot is provided in lids of the invention whereby a cooking utensil may fit within said slot; the handle extending outwardly from the cooking chamber, and the operating portion remaining in the cooking chamber. Additionally, a hook may be provided on the underside of the lid to provide a means of storing the utensil away from food while it is not being used.

Because it is a goal to additionally provide for the cooking of flat foods which need to be flipped, for example hamburgers, fried eggs, pancakes, bacon, et cetera, it is preferable that a skillet be quite deep in comparison to common skillets which do not anticipate food manipulation while the lid is coupled to the skillet. The sides of the skillet are best arranged whereby they extend from the bottom an amount of about two and one half inches or slightly more. Similarly, the lid should also accommodate a deep cooking volume and the depth of the lid is preferably more than one and a half inches deep at the center. While lids of the prior art tend to be quite flat having an aspect ratio; i.e. width-to-height ratio, greater than five or six, apparatus of the invention tend to have aspect ratios of five or less. A lid of the invention may look more like an inverted bowl having a curved surface, than like a flat plate of which the art tends to resemble. When the lid and skillet are coupled together, a four inch hamburger patty can easily be turned from one side to the other. Of course, the exact size of a skillet, lid and hamburger may be highly variable, the arrangement suggested is to allow one to manipulate objects in a cooking chamber of appreciable depth. An example of a hamburger is presented because turning a hamburger in a enclosed vessel is a particularly challenging task. Turning pancakes or eggs in such a skillet would be equally as challenging.

Distinction is made with reference to common skillets having a high aspect ratio. However, the invention is certainly not particular to such types of cookware. All forms of pots, being generally quite deep, pans, kettles, and so forth, may benefit from the concepts disclosed here. This additionally includes cookware for the common household as well as cookware used professionally in restaurants and cafeterias or other commercial uses. By use of "skillet" it is understood that any cooking container from the group including pans, pots, kettles, et cetera, will be included as devices of the invention.

A skillet has a bottom and sides which come together to form a partially enclosed volume. Skillets of the present invention have sides which terminate at a rim forming a receiving seat for the lid. When the lid is matingly received in the rim, the lid and skillet together form a substantially enclosed chamber or vessel which is enclosed except for a slot which is formed into the lid. The skillet may incorporate a handle as is common with skillets as long as the handle is attached to the skillet such that it does not interfere with the slot or any utensil which may extend from the slot.

The rim is fashioned such that juices dripping from the inside under surface of the lid are forced to remain in the cooking chamber. Additionally, the skillet rim holds the lid from sliding about the rim laterally.

The lid is most generally made from a clear material such as glass. Glass is strong, easy to clean, and can be formed by molding into complex shapes with ease. Lids of the invention are distinguished from lids of other apparatus as they generally include a slot operable for accommodating a utensil. Additionally, glass is useful for the present invention because it is desirable for a user of the apparatus to have a view into the cooking vessel. Glass allows one to see into the cooking chamber formed by a coupled skillet and lid.

A properly shaped glass lid may form a partly enclosed volume whereby the lid has a concave side underside and a convex top side. The periphery may be of arbitrary configuration, for example it may be circular, or it may be square or rectangular. The examples which follow all show a lids with circular periphery, however, the invention would work equally as well with a square shaped skillet and lid. These alternative shapes are fully anticipated. With the exception of a slot region, the periphery of the lid may form a closed loop path. The lid may have a handle which may be disposed at the apex of the lid on the top side at the geometric center of the lid.

Preferred lids may have slots which extend from, or near, the periphery of the lid, radially inward toward the center of the lid. Although a slot arranged like this is considered best, a slot arranged about a portion of a concentric circle would operate to achieve the goals of the invention and is fully considered within the scope and spirit of this invention.

Finally, a hook device might be positioned at the underside of the lid to provide means of holding a utensil away from food in the cooking chamber. These features are further defined in the following examples with reference to drawing FIGS. 1–8.

Attention is directed to FIG. 1 which is a prior art drawing of a skillet and lid, where general nomenclature is set forth. A skillet 1 generally is formed of a metallic material such as aluminum, steel or iron. It may have a simple flat bottom and sides which together form a concave cavity or partially enclosed volume. Similarly, a lid 2 may be concave in shape and form an inverse partially enclosed volume. The skillet may have a handle 3 attached thereto at its side. A lid may have a handle 4 fixed at its top as shown. A joint 5 is formed of mating portions of the lid and skillet. It will be appreciated that the ratio of the width W to the height H is about five or greater as is common with most skillets.

Figure 2:
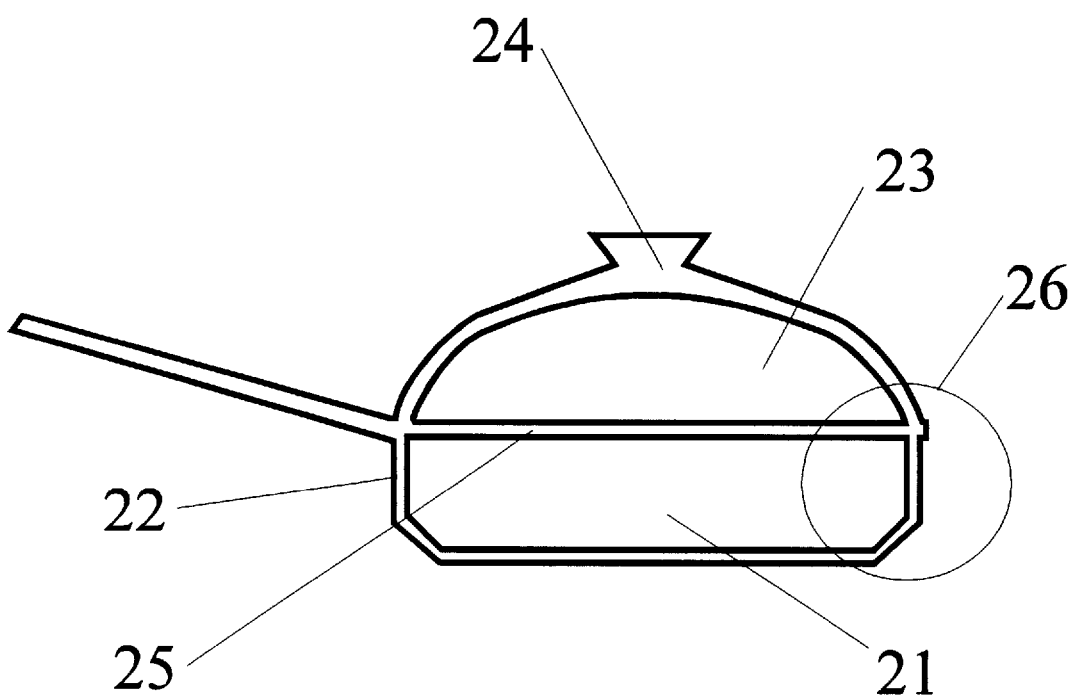
FIG. 2 illustrates a skillet and lid combination where the depth is increased to provide a lower aspect ratio.

FIG. 2 shows a configuration which is considerably deeper than that shown in FIG. 1. The skillet 21 has extended walls which provide an increased height of the cooking chamber. The lid 23 is shown to have a mostly curved profile which provides additional depth near the center where the lid handle 24 is positioned. The rim 25 provides for coupling of the lid and the skillet together and is of a special arrangement. A region 26 is therefore of interest and a magnified view of this region is presented in the following figure, FIG. 3.

Figure 3:
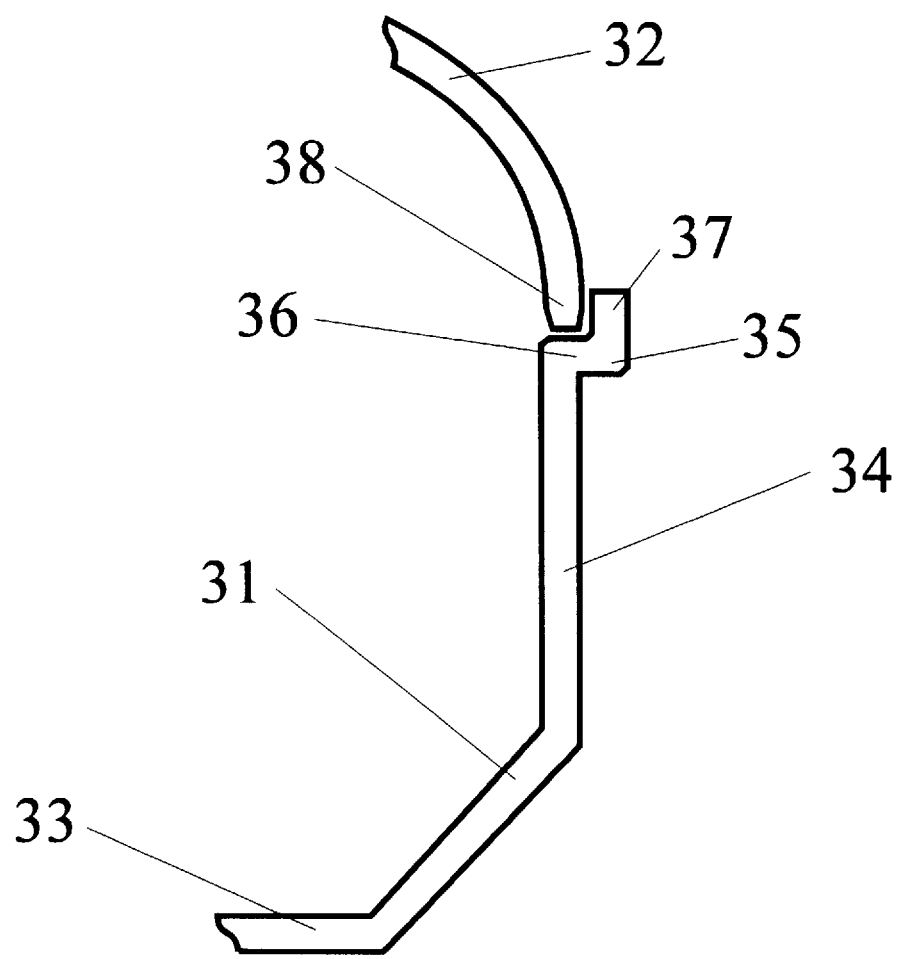
FIG. 3 shows a special rim which aids coupling between a skillet and lid of the invention.

The drawing in FIG. 3 is a profile drawing of the skillet 31 and lid 32 coupling. The skillet has a bottom 33 which curves up and forms sides 34. The sides terminate at a rim 35. The rim is formed of a combination of a seat 36 and a retaining keeper 37. The mean diameter of the seat is configured to match the mean diameter of the lid periphery 38. In this way, a lid placed onto the seat will be held firmly in place by gravity. Any translational forces applied to the lid will be transferred to the retaining keeper and consequently to the skillet. Thus the lid will not move from the skillet. Additionally, juices which find their way to the underside of the lid will flow downwardly to the seat and will be encouraged to go back into the cooking chamber, but not over the retaining keeper.

Figure 4:
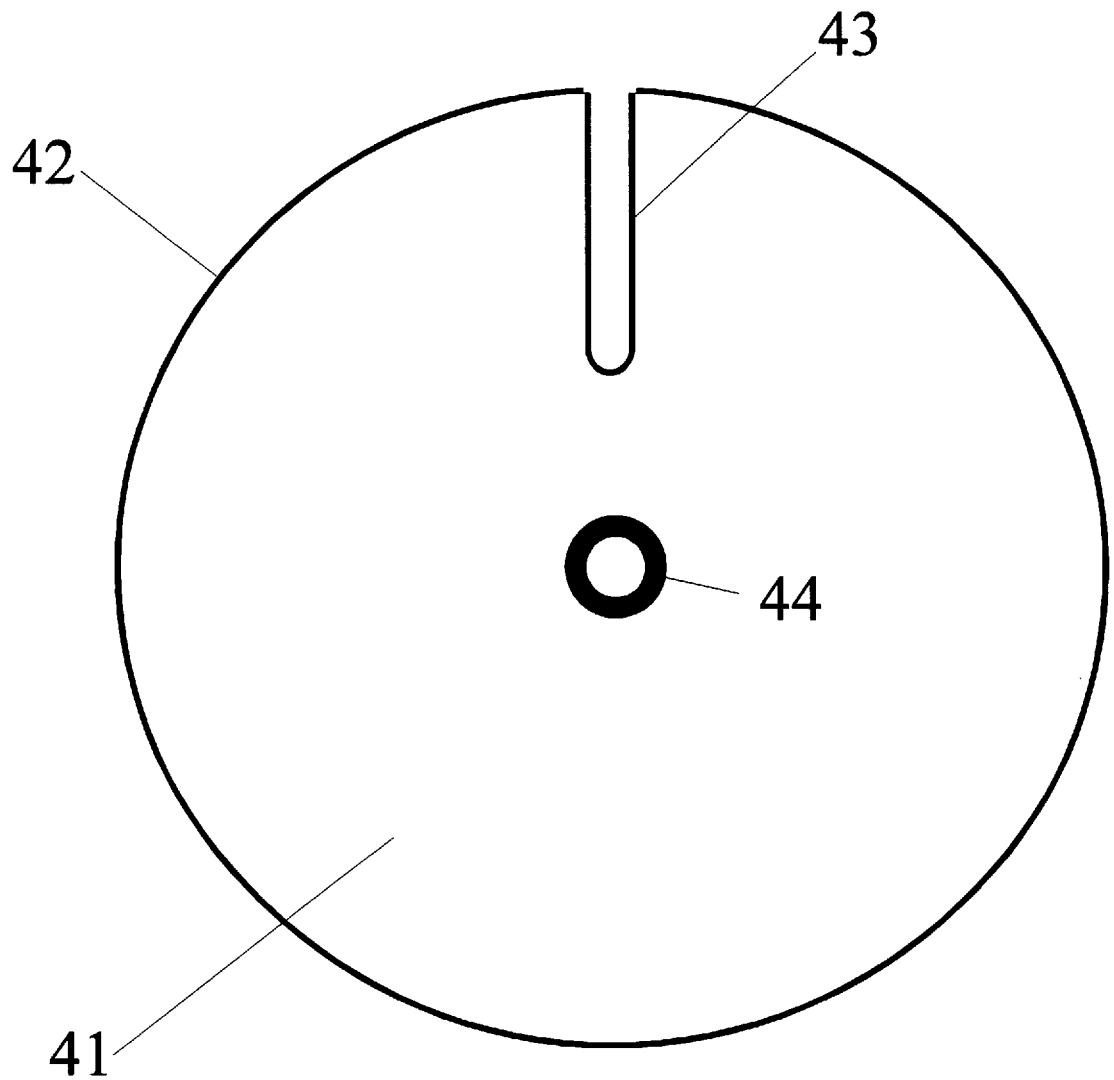
FIG. 4 is a top-view drawing of a lid of the invention.

FIG. 4 shows a top-view of a lid of the invention. In the simplest case, a lid 41 may be molded of glass. The lid may have a circular periphery 42 which forms a closed-loop continuous path except for a small portion at a slot 43. The slot is formed into the glass and may extend from the periphery, radially inward toward the geometric center. A handle 44 may be formed at the apex of the lid. This configuration may be preferred for its simplicity and ease of manufacture. Accordingly it may be quite inexpensive to produce. However, it may not be as durable as one might desire. It may be preferred that a bit of extra expense be allocated to an advanced design in order to improve the lifetime of the device.

Figure 5:
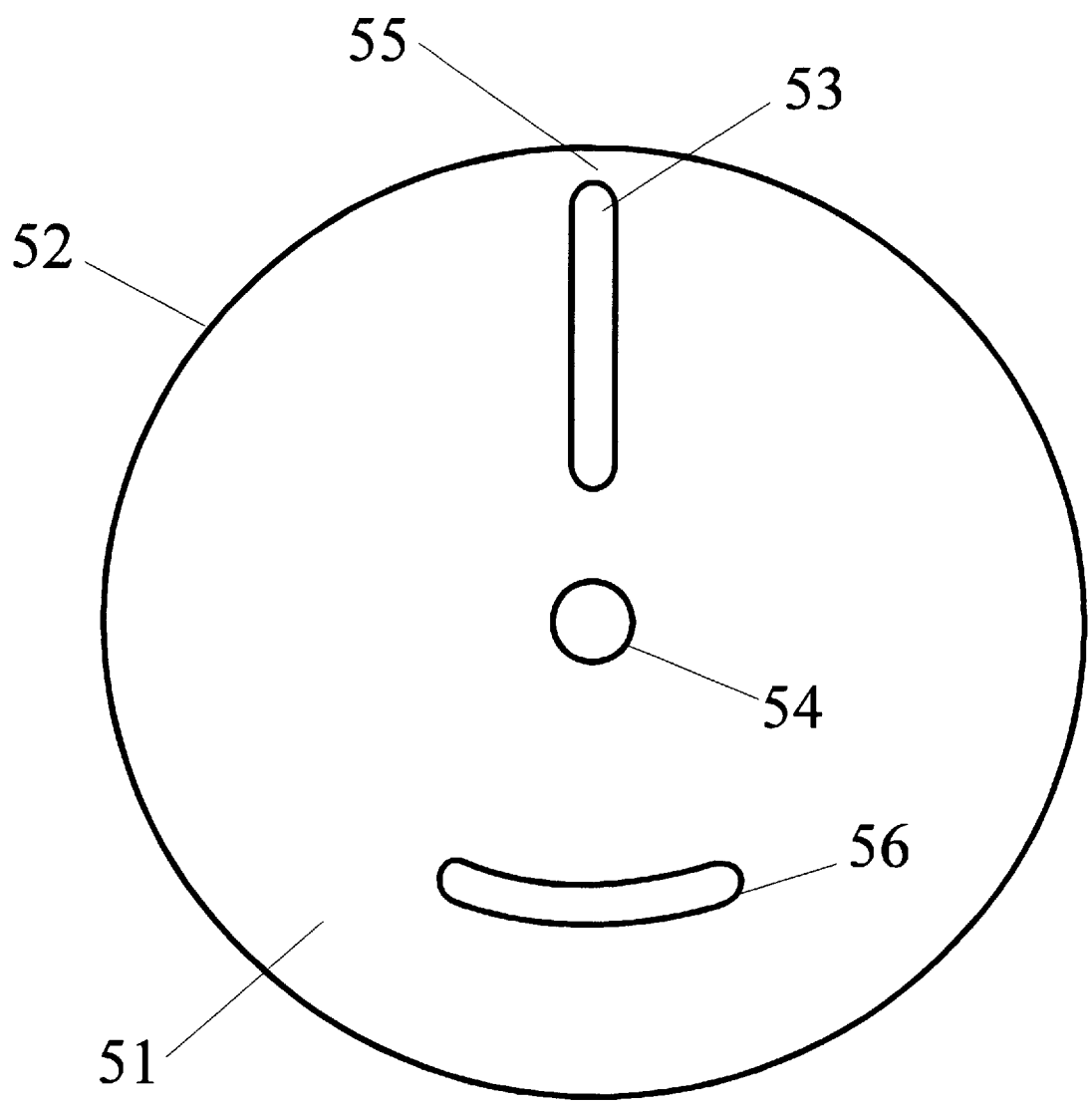
FIG. 5 is a top-view drawing of an alternative version of a lid of the invention.

Accordingly, FIG. 5 shows an alternative version of a lid of the invention. That lid 51 is similarly shaped with a circular periphery 52. However, it has a special slot 53 which does not extend all the way to the periphery. In this case, the periphery is continuous about a closed circular path. The region of the lid indicated at 55 is made of glass and adds to the structural integrity of the device. This improvement to the lid, although possibly more difficult to construct, will allow for a stronger, more rigid device. This improved lid also may incorporate a handle 54 at the apex of the lid. An alternative slot 56 is also shown in the figure. This slot is arranged about a portion of a concentric circle. An actual lid is meant to incorporate either of the two slots, but is not required to have them both. The drawing shows both in order that this disclosure remain brief and to the point. It will be appreciated that the two slots are alternatives.

Unfortunately, with lids of this type, only a limited few utensils (i.e. those with very thin handles) would fit through the slot. The slot could be widened, however this tends not to be desirable because it would provide a greater area from which grease and heat may escape.

Figure 6:
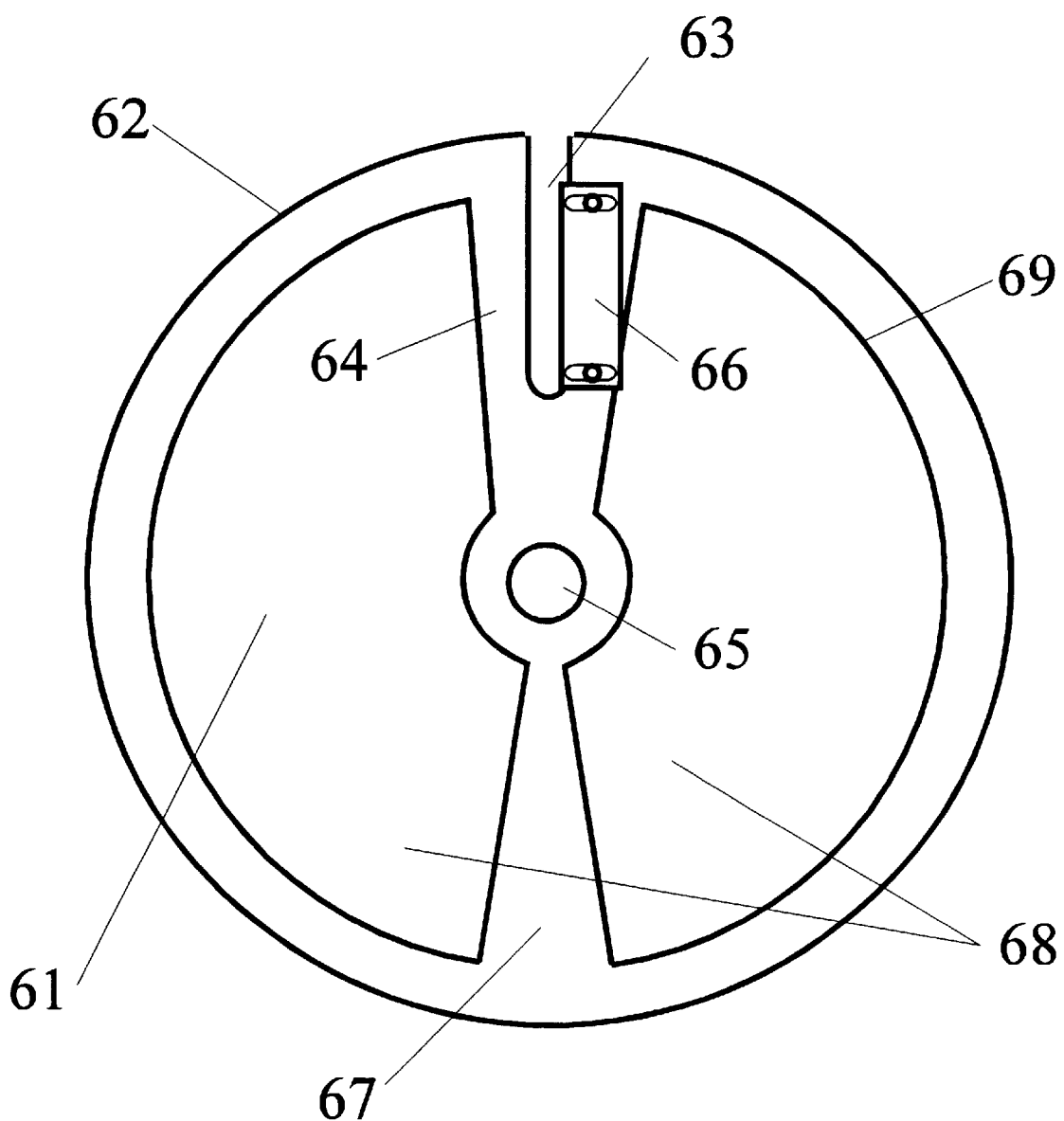
FIG. 6 is still further an alternative version of a lid.

A still further version of the lid which is strong and incorporates a narrow slit is shown in FIG. 6. The entire of the lid 61 is comprised of a metallic frame 62 which is configured to receive and hold therein glass window inserts 68. Although glass may be preferred, any transparent durable material suitable for cookware may be used. The slot 63 is formed into a metallic portion of the lid, i.e. in the frame. On either side of the slot are metallic frame members 64. A handle 65 is also supported by a portion of the metal frame disposed about the lid apex. A sliding cover 66 may be added to alternatively close and open the slot while allowing for steam to escape at one end and a utensil handle to extend from the other. An additional member 67 is also part of the metallic frame. Two glass window inserts 68 may be either merely set onto receiving ridges 69 of the metal frame or may be snapped into place. In the case whereby the glass merely sits onto the metal frame, a simple ridge is formed about the frame in a complementary shape with respect to the glass which sets therein. It is possible to make the ridge slightly undersized or with a lip. In this way, slight pressure would be needed to urge the glass into place. Proper arrangement of the metal frame makes a mechanical interlock. Glass snapped into place may be held there securely. However, after use, they may be removed again from the frame for cleaning purposes. This is accomplished by applying pressure in the direction opposite or against the interlock.

Figure 7A:
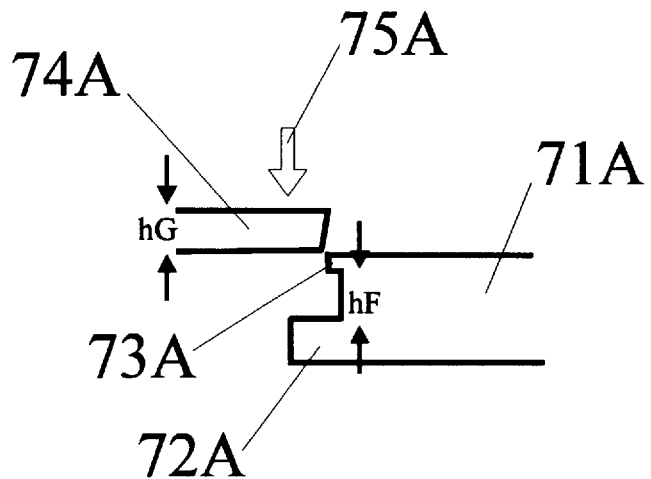
FIG. 7 is a drawing of a mechanical interlock which may be incorporated in some versions of apparatus of the invention.
Figure 7B:
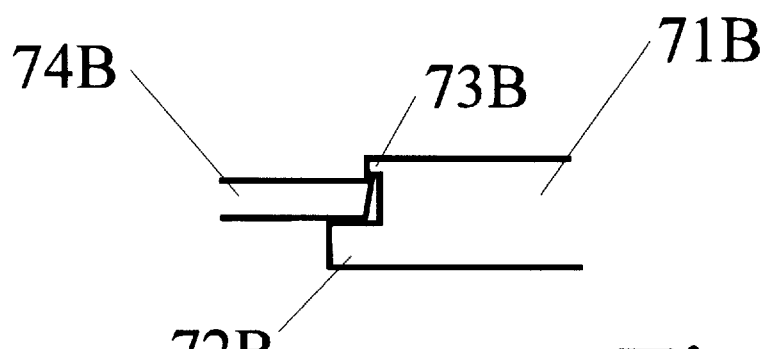

FIGS. 7A and 7B show an example of a mechanical interlock which may be formed about receiving seats 69. The drawing is a profile view of a metal frame and a glass window insert 74A which form the joint. The metal frame 71A may have a seat 72A separated from a retaining lip 73A. The separation distance hF is slightly greater than the thickness hG of the glass window. The edge of the glass window may be slightly tapered to facilitate its advance past the lip. When downward pressure 75A is applied to the glass window, it "clicks" into place. When seated as shown in FIG. 7B, the metal frame 71B firmly holds the glass window 74B between the seat 72B and the retaining lip 73B.

Removal requires pressure applied in the opposite direction. This encourages the frame to bend slightly allowing the edge of the window to pass the retaining lip of the frame, thus allowing the glass to come free from its hold.

Figure 8:
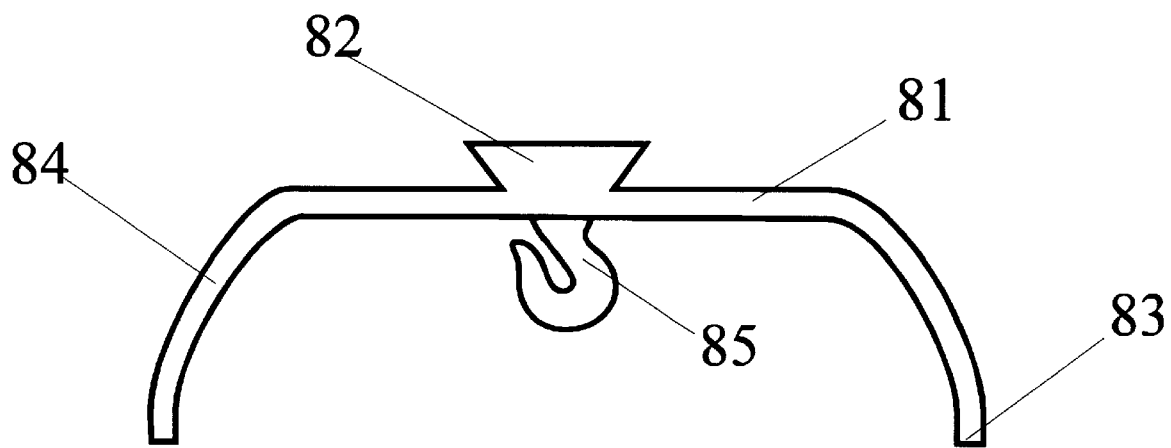
FIG. 8 shows and additional feature which may be incorporated into various versions of lids of the invention.

Finally, FIG. 8 shows a lid 81 of the invention with a special added feature. Like the other versions, it has a handle 82 periphery 83 and curved sides 84, however, in addition it also has a hook 85 affixed to the underside of the lid at the apex. The hook may be used to hang a utensil therefrom. This keeps the utensil from the food and heat such the it does not interfere with cooking during the time when it is not being used.

Although the present invention has been described in considerable detail with clear and concise language and with reference to certain preferred versions thereof including the best mode anticipated by the inventor, other versions are possible. Therefore, the spirit and scope of the appended claims should not be limited by the description of the preferred versions contained therein.

It is claimed:

1. A cooking apparatus having a substantially enclosed cooking chamber which accommodates a utensil in a fashion such that the utensil remains operable, the apparatus comprising:

a skillet; and a lid, said skillet comprising a bottom and sides which terminate at a rim configured to matingly receive thereon a lid, said lid being formed of a durable transparent material comprising: a periphery; an apex; and a slot, said slot being disposed in said lid between the periphery and the apex.

2. A cooking apparatus of claim 1 said rim is further comprised of:

a seat; and a retaining keeper, said seat being a flat and disposed substantially in a horizontal plane, the seat being joined at an outside periphery by the retaining ring which extends vertically away from the seat whereby a lid placed therein is held from moving laterally.

3. A cooking apparatus of claim 1, said lid being further comprised of a convex top surface and a concave under surface which come together to form the periphery, still further comprised of a hook affixed at the apex of the concave under surface.

4. A cooking apparatus of claim 1, the slot being disposed with an opening on one end at the periphery, the slot extending from the periphery toward the apex radially inward.

5. A cooking apparatus of claim 1, the slot being disposed between the periphery and the apex, the slot extending from near the periphery toward the apex radially inward, the periphery forming a closed-loop path.

6. A cooking apparatus of claim 1, the slot being disposed between the periphery and the apex, the slot extending along a concentric path, the periphery forming a closed-loop path.

7. A cooking apparatus of claim 1, said lid being comprised of: a frame and at least one window, said frame being formed of a metallic material having a region which is fashioned to operably receive said window therein, the frame additionally having a slot formed therein whereby a utensil may extend therefrom and be operated while the lid is coupled to the skillet.

8. A cooking apparatus of claim 1, said lid being comprised of: a frame and two glass windows, said frame being formed of a metallic material having two regions which are fashioned to operably receive said windows therein, the frame additionally having a slot formed therein whereby a utensil may extend therefrom and be operated while the lid is coupled to the skillet.

9. A cooking apparatus of claim 8, the regions of said frame having formed thereabout their peripheries a seat operable for holding windows set thereon.

10. A cooking apparatus of claim 9, said region peripheries being slightly smaller in size than window extents thus forming a force fit relationship between the windows and frame regions.

11. A cooking apparatus of claim 8, the regions of said frame having formed thereabout their peripheries a mechanical interlock operable for receiving said windows therein and holding them firmly against disturbances.

12. A cooking apparatus of claim 11, the mechanical interlock having a seat and a lip disposed apart from each other a distance slightly greater than the thickness of a window whereby a window placed therebetween may be held.

13. A cooking apparatus having a substantially enclosed cooking chamber which accommodates a utensil in a fashion such that the utensil remains operable, the apparatus comprising:

a skillet; and a lid, said skillet comprising a bottom and sides which terminate at a rim configured to matingly receive thereon a lid, said lid being formed of a durable transparent material comprising: a periphery; an apex; and a slot, said slot being disposed in said lid between the periphery and the apex, having a elongated shaped periphery of two parallel sides and curved ends.

14. A cooking apparatus having a substantially enclosed cooking chamber which accommodates a utensil in a fashion such that the utensil remains operable, the apparatus comprising:

a skillet; and a lid, said skillet comprising a bottom and sides which terminate at a rim configured to matingly receive thereon a lid, said lid being formed of a durable transparent material comprising: a periphery; an apex; and a slot, said slot being disposed in said lid between the periphery and the apex, having a elongated shaped periphery of two concentric sides and curved ends.

15. A cooking apparatus of claim 1 said slot being operable to receive a utensil therein without additional hardware or mounting devices.

* * * * *